United States Patent
Senia et al.

(10) Patent No.: US 11,435,100 B2
(45) Date of Patent: Sep. 6, 2022

(54) PERSONAL AIR SYSTEM FOR OFFICES

(71) Applicant: NUMA Products, LLC, New York, NY (US)

(72) Inventors: Robert Senia, Morganville, NJ (US); Gabriel Peschiera, New York, NY (US); Dean DiPietro, Brooklyn, NY (US)

(73) Assignee: NUMA Products, LLC, New York, NY (US)

( * ) Notice: Subject to any disclaimer, the term of this patent is extended or adjusted under 35 U.S.C. 154(b) by 59 days.

(21) Appl. No.: 16/923,836

(22) Filed: Jul. 8, 2020

(65) Prior Publication Data

US 2021/0302037 A1    Sep. 30, 2021

Related U.S. Application Data

(60) Provisional application No. 63/000,673, filed on Mar. 27, 2020.

(51) Int. Cl.
*F24F 3/00* (2006.01)
*F24F 11/30* (2018.01)
(Continued)

(52) U.S. Cl.
CPC .............. *F24F 11/30* (2018.01); *F24F 3/00* (2013.01); *F24F 7/00* (2013.01); *F24F 7/013* (2013.01);
(Continued)

(58) Field of Classification Search
CPC .... F24F 3/00; F24F 7/00; F24F 13/065; F24F 13/10
See application file for complete search history.

(56) References Cited

U.S. PATENT DOCUMENTS 4,872,397 A    10/1989  Demeter et al.
5,117,900 A     6/1992  Cox
(Continued)

FOREIGN PATENT DOCUMENTS

KR       101251281 B1    4/2013

OTHER PUBLICATIONS

CTBUH Research Paper, Personal Office Air: Ending Thermostat Wars, by Gabriel Peschiera et al., Ctbuh J., Issue IV, 2019 (8 pages).

*Primary Examiner* — Mohammad Ali
*Assistant Examiner* — Vincent W Chang
(74) *Attorney, Agent, or Firm* — The Juhasz Law Firm

(57) ABSTRACT

A cooling and ventilation outlet is described, including a shell configured to connect to an HVAC duct and an inner body that may be securely attached within the shell such that air from the HVAC duct passes through the inner body. The inner body may include: a directable air output nozzle, a first actuator configured to control a direction of the nozzle, an adjustable damper, a second actuator configured to control airflow through the inner body by actuating the adjustable damper, an indicator that may include at least one controllable visual element, a pressure sensor configured for use in determining airflow through the inner body, and circuitry including a network interface. The circuitry is configured to accept commands over a network, to accept readings from the pressure sensor, and to control the first actuator, the second actuator, and the indicator.

23 Claims, 12 Drawing Sheets

(51) Int. Cl.
*F24F 7/00* (2021.01)
*F24F 7/013* (2006.01)
*F24F 11/523* (2018.01)
*F24F 11/54* (2018.01)
*F24F 11/56* (2018.01)
*F24F 11/64* (2018.01)
*F24F 11/65* (2018.01)
*G05B 19/042* (2006.01)
*F24F 110/10* (2018.01)
*F24F 120/12* (2018.01)
*F24F 120/20* (2018.01)

(52) U.S. Cl.
CPC ............ *F24F 11/523* (2018.01); *F24F 11/54* (2018.01); *F24F 11/56* (2018.01); *F24F 11/64* (2018.01); *F24F 11/65* (2018.01); *G05B 19/0426* (2013.01); *F24F 2007/0025* (2021.01); *F24F 2110/10* (2018.01); *F24F 2120/12* (2018.01); *F24F 2120/20* (2018.01); *G05B 2219/23039* (2013.01); *G05B 2219/2614* (2013.01)

(56) References Cited

U.S. PATENT DOCUMENTS

| | | | |
|---|---|---|---|
| 5,156,203 A | 10/1992 | Funakoshi et al. | |
| 5,180,333 A | 1/1993 | Shyu | |
| 6,802,381 B1* | 10/2004 | Koors | B62D 57/00 |
| | | | 180/7.1 |
| 9,457,907 B2 | 10/2016 | Brown et al. | |
| 2015/0111486 A1* | 4/2015 | Migliore | F24F 13/065 |
| | | | 454/305 |
| 2016/0348930 A1* | 12/2016 | Mirante | F24F 11/30 |
| 2016/0363341 A1* | 12/2016 | Arens | F24F 7/065 |
| 2017/0264171 A1* | 9/2017 | Williams | H02K 11/27 |
| 2018/0031265 A1* | 2/2018 | Janniello | F24F 11/30 |
| 2019/0128557 A1* | 5/2019 | Schmidt | F24F 13/0218 |
| 2019/0226717 A1* | 7/2019 | Herman | F24F 13/24 |
| 2020/0164722 A1* | 5/2020 | Baker | B60H 1/3442 |

* cited by examiner

PERSONAL AIR SYSTEM FOR OFFICES

BACKGROUND

Field

The specification relates to the provision of individual cooling and ventilation in an office setting. In particular, the specification describes a cooling and ventilation outlet that is contained in an easily replaceable or movable inner body that fits within a shell that provides a connection to an HVAC duct. The inner body is a substantially self-contained unit containing electronic and mechanical components for the regulation of air volume and direction.

Description of the Related Art

Dissatisfaction with office temperatures, particularly in shared or open-plan offices, is so common that it is almost an accepted fact of office life. The central issue is not that offices are generally too hot or too cold, but that at any given moment they are too hot for some and too cold for others. Temperature preferences of individual office workers may differ significantly. To prevent fighting over thermostat settings, each person would need to have the ability to create an effective temperature or thermal sensation that may be dramatically different from her neighbor. This has not been practical with current building HVAC design practices.

Various models for personal temperature control in offices, including devices for each worker, have been explored over the years. However, schemes such as under-floor air distribution and custom desks with built-in cooling devices have not been widely adopted. Underfloor air has suffered challenges with having diffusers in the floor, such as aesthetics, chairs rolling over diffusers, furniture blocking diffusers, and debris falling into diffusers. Desks with built-in cooling are expensive and are impractical to rearrange when floor changes are needed. Previously-known systems have been unable to deliver different thermal conditions for occupants who sit near each other in a way that meets aesthetic, cost, and energy constraints.

SUMMARY

Technologies are described for providing a cooling and ventilation outlet that is contained in an easily replaceable or movable inner body that fits within a shell that provides a connection to an HVAC duct. The inner body is a substantially self-contained unit containing electronic and mechanical components for the regulation of air volume and direction. The ability for a user to control the air volume and direction of a selected outlet provides individual cooling and ventilation in an office setting.

One general aspect includes a cooling and ventilation outlet including a shell configured to connect to an HVAC duct, the shell including a first connector component and an inner body including a second connector component configured to connect to the first connector component to secure the inner body within the shell such that air from the HVAC duct passes through the inner body. The inner body may include: an airflow chamber configured to direct air from the HVAC duct through the inner body; a directable air output nozzle disposed at an output end of the airflow chamber; a first actuator configured to control a direction of the directable air output nozzle; an adjustable damper; a second actuator configured to control airflow through the inner body by actuating the adjustable damper; an indicator disposed on a visible portion of the inner body, wherein the indicator may include at least one controllable visual element; a pressure sensor configured for use in determining airflow through the inner body; and circuitry including a network interface, wherein the circuitry may be configured to accept commands over a network, to accept readings from the pressure sensor, and to control the first actuator, the second actuator, and the indicator.

One general aspect includes a method of controlling an individually adjustable cooling and ventilation outlet in an office setting, including a plurality of individually adjustable cooling and ventilation outlets. The method includes providing an individually adjustable cooling and ventilation outlet that may include a directable air output nozzle controlled by a first actuator, an adjustable damper controlled by a second actuator, a pressure sensor configured for use in determining airflow through the individually adjustable cooling and ventilation outlet, an indicator disposed on a visible portion of the individually adjustable cooling and ventilation outlet, and circuitry including a network interface, the circuitry configured to accept commands over a network, to accept readings from the pressure sensor, and to control the first actuator, the second actuator, and the indicator. The method also includes providing an application that executes on a computing device and that enables the computing device to communicate over the network with individually adjustable cooling and ventilation outlets; selecting one outlet of the plurality of individually adjustable cooling and ventilation outlets to be controlled by the computing device; displaying on the computing device, by the application, a position control and a flow control; receiving from a user of the computing device at least one of a position input and/or a flow control input; and sending a command over the network from the application to the selected outlet to cause the circuitry to control the first actuator according to the position input and/or to control the second actuator according to the flow control input.

DETAILED DESCRIPTION

Figure 1:
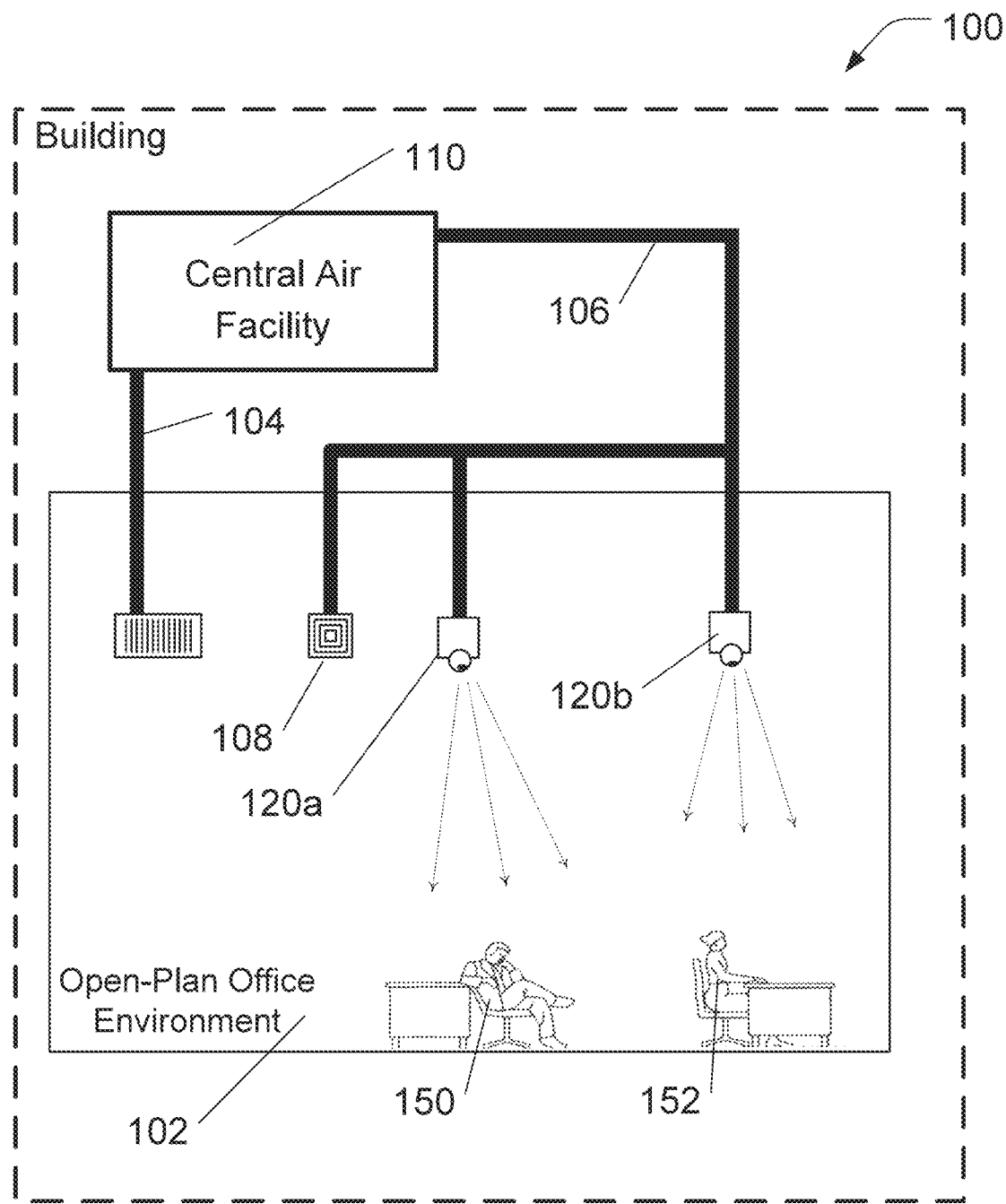
FIG. 1 shows an air conditioning and ventilation system for an office environment.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are explicitly contemplated herein.

Disclosed herein is a cooling and ventilation outlet that is contained in an easily replaceable or movable inner body that fits within a shell that provides a connection to an HVAC duct. The inner body is a substantially self-contained unit containing electronic and mechanical components for the regulation of air volume and direction. The ability for a user to control the air volume and direction of a selected outlet provides individual cooling and ventilation in an office setting. In some embodiments, this control is achieved through the use of an Internet-based interface (web- or application-based) that permits a user to select a particular outlet and to control the airflow and direction of an overhead air nozzle of that outlet.

FIG. 1 shows an air conditioning and ventilation system 100 for a typical office environment 102. During normal cooling operation, warm air is removed from the office environment 102 through a return air duct 104 and is replaced by cool air through a supply duct 106, directed into the office environment 102 through a cooling and ventilation outlet 108. The air is cooled and moved through the supply duct by a central air conditioning facility 110, which may be part of a more extensive building air handling system.

A goal of the system 100 is to maintain the air in the office environment 102 at a comfortable temperature. Unfortunately, a temperature that is comfortable to one person 150 in the office environment 102 may be uncomfortable to a second person 152. Further, since the office environment 102 is an open-design office, heating or cooling the entire office area to a particular temperature affects everyone in the office environment 102.

In accordance with the disclosure, this difficulty is overcome by using individually controllable cooling and ventilation outlets 120. These outlets provide cool air through a nozzle, in which both the direction of the nozzle and the airflow through the nozzle can be controlled by individual users using, e.g., an application on a computing device such as a smartphone. This permits person 150 to control the cooling and ventilation outlet 120a, and person 152 to separately control the cooling and ventilation outlet 120b, providing different individual airflow rates and directions to people 150 and 152.

As will be seen below, the cooling and ventilation outlets 120a and 120b are modular, with a shell that is connected to the supply duct 106, and a removable inner body that contains the electronic and mechanical components to permit individualized control of the direction and airflow rate through the outlets. This permits the cooling and ventilation system 100 to be reconfigured and customized according to the needs in the office environment 102.

Figure 2A:
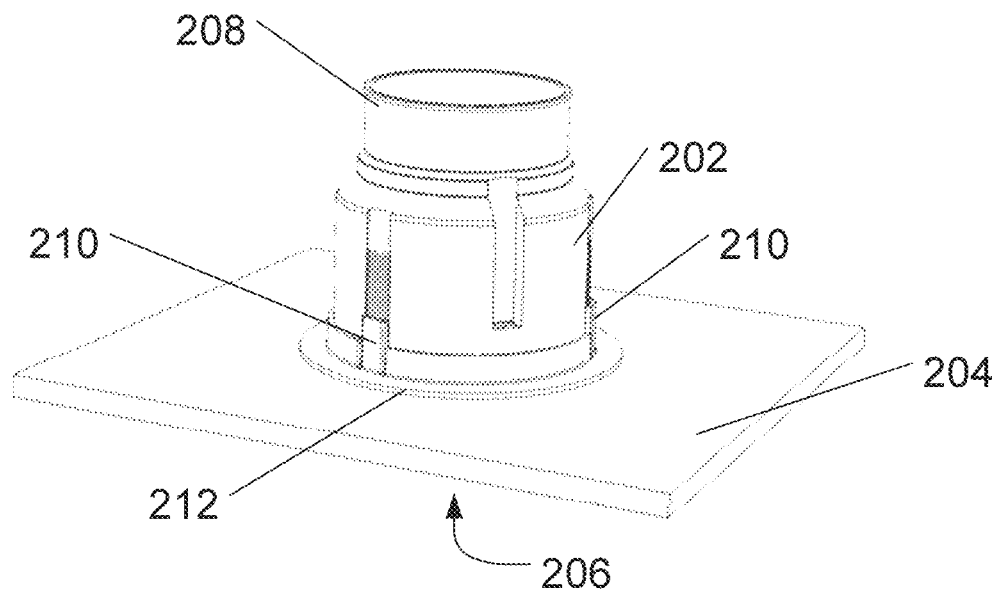
FIGS. 2A-2D show views of removably connecting an inner body that contains components of an individually adjustable cooling and ventilation outlet according to various embodiments into a shell that is connected to building ventilation ducts.

FIGS. 2A-2D show views of removably connecting an inner body that contains most of the components of an individually adjustable cooling and ventilation outlet according to various embodiments into a shell that is connected to building ventilation ducts. FIG. 2A shows a view of a shell 202 fitted into a ceiling tile 204. The shell 202 includes a proximal end 206 that opens into the room that is to be air-conditioned, and a distal end 208, which is configured to be connected to an air conditioning and ventilation duct (not shown) that runs above the ceiling tile 204 in a building and is therefore generally hidden from view.

In the embodiment shown in FIG. 2A, the shell is attached to the ceiling tile using attachment clips 210, which are connected to an opening ring 212 that is disposed surrounding an opening in the ceiling tile 204. It should be noted that in some embodiments, the opening ring 212 may also include a portion (not shown) that is visible from a bottom surface of the ceiling tile 204, giving the opening in the ceiling tile 204 a finished appearance.

The shell 202 shown in FIG. 2A is only one type of shell that may be used with various embodiments. Similar shells can be provided to fit with a variety of air duct sizes and configurations. Also, a variety of connection types, including, for example, adhesives, screws clamps, and other permanent or removable connection means may be used to connect a shell to a ceiling tile or other building element. Additionally, such shells need not always be attached to a ceiling tile. For example, in offices having visible or exposed ductwork, ceiling tiles are generally not used, so a shell used with such exposed ductwork will also be exposed, and will be visible from the office space in which it is used. Accordingly, a shell, according to various embodiments, may be configured to have an outer appearance that is consistent with the style or décor of the office in which it is being used. In general, the outer appearance of the shell will not adversely affect its functional aspects in various embodiments.

Figure 2B:
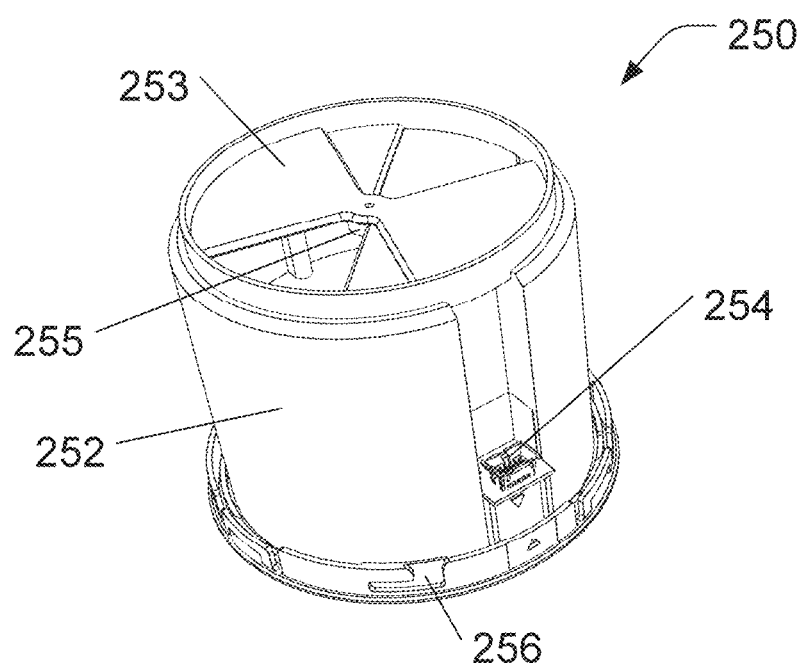

FIG. 2B shows an outer view of an inner body 250 according to various embodiments. In this view, the inner body 250 includes a housing 252, a damper 253 (shown partially open in FIG. 2B) that can be rotated by a damper actuator 255 within the inner body 250 to adjust the flow of air through the inner body 250, an electrical connector 254, and an L-shaped slot 256.

The electrical connector 254 may connect the inner body 250 to an electrical power source, as well as optionally connecting the inner body 250 to a wired network and/or providing electrical connections to one or more external sensors or other devices. In some embodiments, the electrical connector may include an ethernet connector, and electrical power may be provided through power-over-ethernet, according to IEEE standards 802.3af and 802.3at. In some embodiments, electrical power may be provided by a battery (not shown) that is internal to the inner body 250 so that providing power through an electrical connector is not needed. In some embodiments, the inner body 250 may include wireless networking circuitry (not shown in FIG. 2B), so that there is no need to provide a network connection through the electrical connector 254. For embodiments that do not need wired access to networks, external sensors or devices, or to an external source of electrical power, electrical connector 254 may be omitted.

The L-shaped slot 256 is used, in conjunction with a pin on an inner surface of the shell 202, to mount the inner body 250 in the shell 202. In the embodiment that is shown in FIG. 2B, the L-shaped slot 256 is part of a bayonet mount or fastener that holds the inner body 250 in the shell 202. It will be understood that although only one L-shaped slot is shown in FIG. 2B, there will typically be a plurality of such slots positioned around a circumference of the housing 252 of the inner body 250. Additionally, in various embodiments, other previously-known fasteners, connectors, or mounting means, including, for example, a push-to-release fastener (not shown) may be used to hold the inner body 250 within the shell 202. In such embodiments, the L-shaped slot 256 may be omitted or may be replaced with other fastener, connector, or mounting means.

Figure 2C:
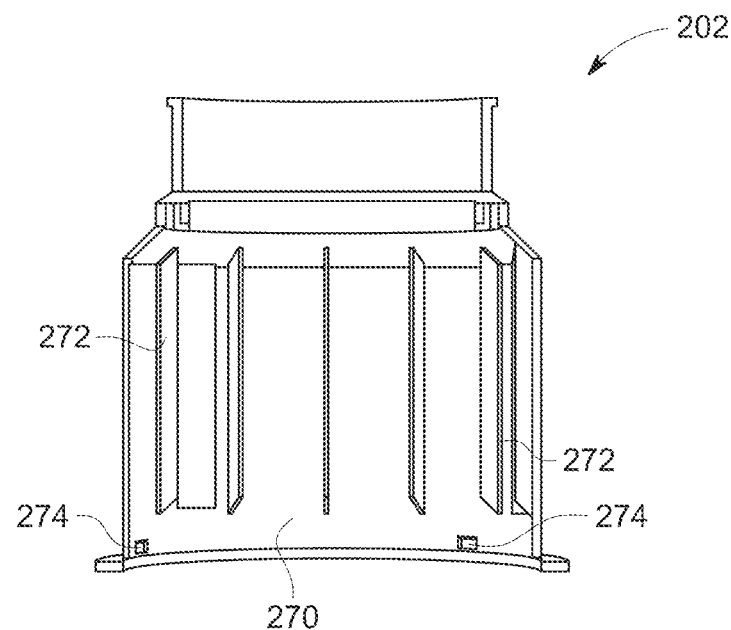

FIG. 2C shows an interior surface 270 of the shell 202. The interior surface 270 includes a plurality of optional ribs 272 and a plurality of pins 274.

The plurality of ribs 272 is optional and may be used to provide space between the inner body 250 and the shell 202, for example, for wires, sensors, or other devices external to the inner body 250. Additionally, the ribs 272 may be used to position the inner body 250 within the shell 202. For example, the ribs 272 may be used to center the inner body 250 within the shell 202. The ribs 272 may also provide structural integrity while keeping the shell 202 thinner and lighter than it would be without the use of the ribs 272. The ribs 272 may also reduce friction during insertion of the inner body 250.

The plurality of pins 274 is used in conjunction with a plurality of L-shaped slots such as the L-shaped slot 256 (shown above in FIG. 2B) on the inner body 250 to removably fasten the inner body 250 within the shell 202. In the embodiment that is shown in FIG. 2C, the plurality of pins 274 are part of a bayonet mount or fastener that holds the inner body 250 in the shell 202. In various embodiments, other previously-known fasteners, connectors, or mounting means, including, for example, a push-to-release fastener (not shown) may be used to hold the inner body 250 within the shell 202. In such embodiments, the plurality of pins 274 may be omitted or may be replaced with other fastener, connector, or mounting means.

Figure 2D:
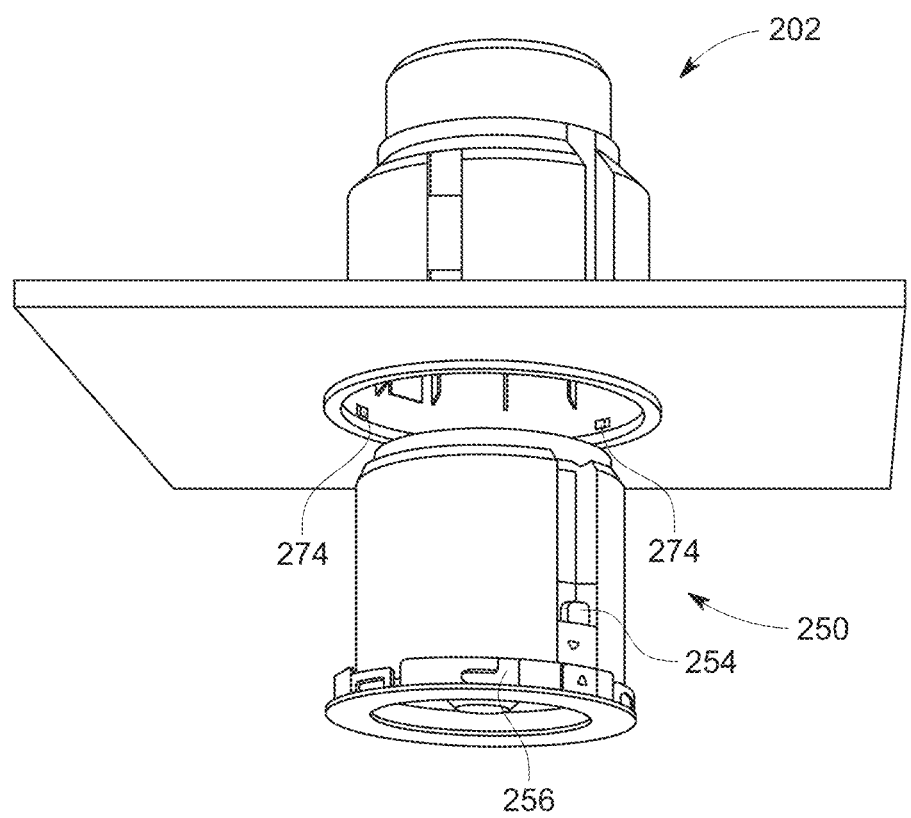

FIG. 2D illustrates placing the inner body 250 into the shell 202. As can be seen, in this embodiment, the shell 202 is attached to a ceiling tile 204, and the inner body 250 is inserted into the proximal end 206 of the shell 202. It will be understood that the distal end 208 of the shell 202 would typically be connected to an air conditioning and/or ventilation duct (not shown).

In the embodiment as shown, as discussed above, a bayonet mount is used to mount the inner body 250 within the shell 202. Using a bayonet mount, the plurality of pins 274 (shown above, in FIG. 2C) of the shell 202 engage with the L-shaped slots 256 (shown more clearly above in FIG. 2B) of the inner body 250. To mount the inner body 250 within the shell 202, the inner body 250 is inserted into the shell 202 such that the plurality of pins 274 is within corresponding L-shaped slots 256 of the inner body 250. The inner body 250 is then rotated by an amount sufficient to engage the plurality of pins 274 with the corresponding L-shaped slots 256 to fasten the inner body 250 within the shell 202. Additionally, in some embodiments, wires (not shown) carrying electrical power and/or data or other signals may be connected to the electrical connector 254 of the inner body 250. It will be understood that if mounting, connecting, or fastening means other than a bayonet mount is used, the method of removably mounting the inner body 250 within the shell 202 may vary according to the type of mounting, connecting, or fastening means that is used.

Because the inner body 250 is removable and replaceable, it is relatively easy to replace the inner body 250 if anything in the inner body 250 needs repair. Additionally, the type and specifications of the inner body 250 may vary, and such varying inner bodies may be placed in shells throughout an office space to customize the air conditioning and ventilation outlets according to changing needs in an office space. It should be noted that in some embodiments, the inner body 250 can be removed from the bottom of the shell 202, without any screws or changes to duct attachment. The inner body 250 can be quickly and easily replaced, whether because it's broken or because a new model is available. This makes field repairs unlikely, as the inner body 250 can simply be swapped out for another, and repairs handled off-site. Additionally, because the shell 202 has no moving parts, it may last longer, and may accommodate multiple generations of upgraded and/or improved inner bodies.

Figure 3:
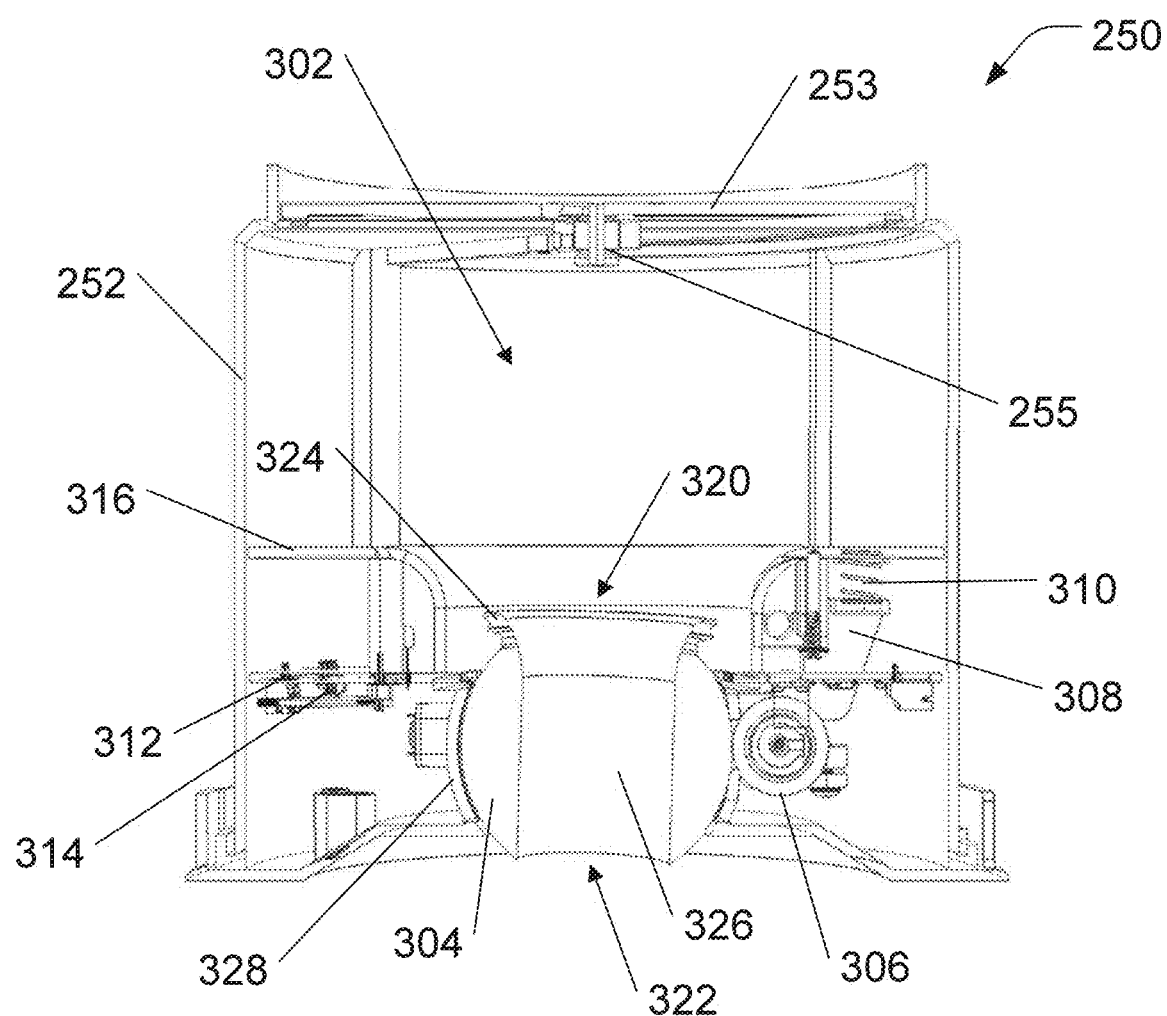
FIG. 3 shows a cross-section view of the interior of the inner body.

FIG. 3 shows a cross-section view of the interior of the inner body 250. As shown in FIG. 3, the inner body 250 includes a housing 252 that defines an interior airflow chamber 302, through which air flows from the duct (not shown) that is connected to the shell (not shown in FIG. 3), to a nozzle 304. The nozzle 304 directs output airflow in a selected direction, as will be discussed in greater detail below. In the embodiment of FIG. 3, the nozzle 304 is a ball nozzle, having an inlet 320 through which air passes from the airflow chamber 302 into the nozzle 304, and an outlet 322, which directs air in a selected direction into the office space. The inlet 320 is formed in a lip 324 of the nozzle 304, and a channel 326 runs between the inlet 320 and the outlet 322. The nozzle 304 is held within the inner body 250 by a nozzle cage 328. In the embodiment shown in FIG. 3, the nozzle cage 328 permits the nozzle 304 to be rotated around two axes, providing two rotational degrees of freedom.

The direction in which the nozzle 304 directs output airflow is controlled by two roller wheels 306 (only one of which is visible in the view shown in FIG. 3), which are controllably rotated by nozzle actuators (not clearly visible in the view shown in FIG. 3). The roller wheels (and the actuators that rotate them) are connected to pivots 308 (only one of which is visible in the view shown in FIG. 3). A spring force is applied to each pivot 308 by a spring 310, pushing the roller wheels 306 into contact with a surface of the nozzle 304.

As discussed above, with reference to FIG. 2B, the inner body 250 includes a damper 253 that adjusts the airflow from the duct and shell into the airflow chamber 302. In the embodiment shown in FIG. 3, the damper 253 is configured to controllably adjust the airflow by rotating in a plane substantially horizontal to the direction of airflow to partially open or block openings in the housing 252. The damper actuator 255 rotates the damper 253 to control the airflow.

The inner body 250 also includes a circuit board 312, including circuitry 314. The circuitry 314 may include a network interface (wired, wireless, and/or optical), a pressure sensor, connectors for connecting to additional sensors, and circuitry (which may include one or more microcontrollers or other processors, and a memory containing instructions) configured to control the nozzle actuators and the damper actuator 255, to control an indicator (as discussed in detail below), to accept sensor readings from the pressure sensor and any additional sensors, and to accept commands over the network.

The circuit board 312 is protected from dust accumulation by an isolation panel 316. The isolation panel 316 may also be configured to direct air in the airflow chamber 302 toward the nozzle 304.

It will be understood that in some embodiments, additional components may be provided in the inner body 250. For example, the inner body 250 may include a battery (not shown) or may include a fan (not shown) in the airflow chamber 302. Such a fan could be used to increase airflow through the airflow chamber 302 when additional airflow is needed, and (when not being used as a fan) to use the airflow provided through the duct to generate power to, e.g., recharge a battery.

Figure 4:
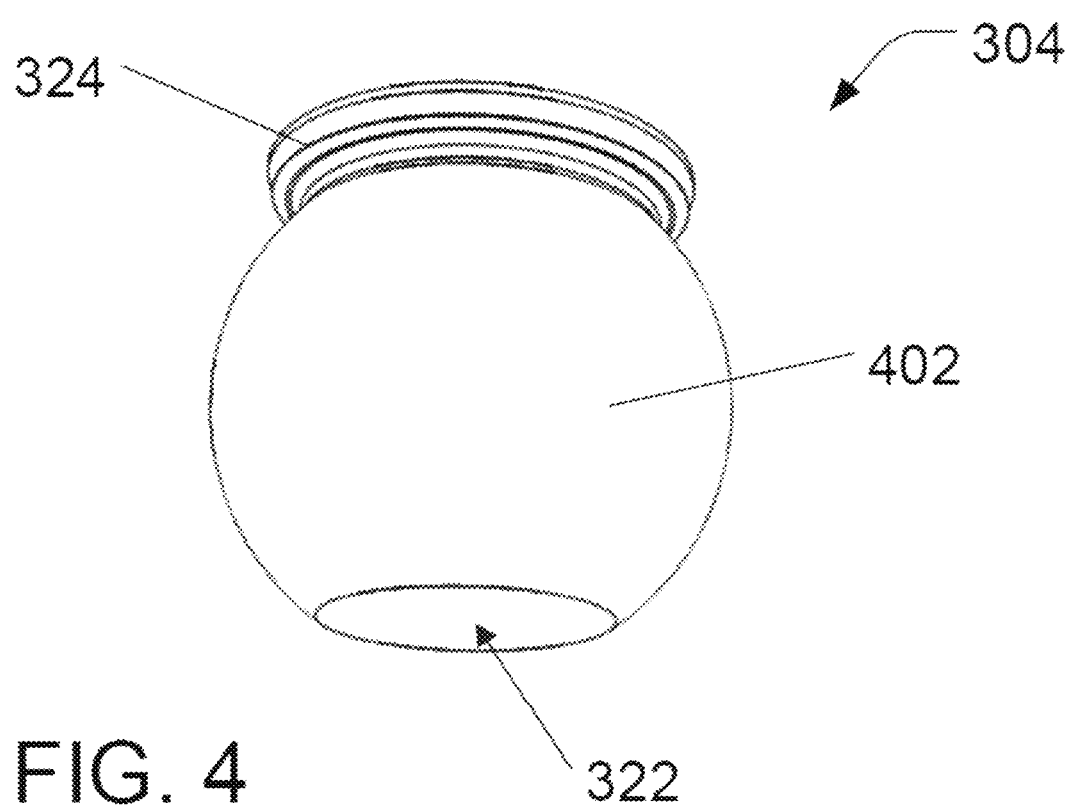
FIG. 4 shows a detailed view of a nozzle in accordance with the disclosure.

FIG. 4 shows a more detailed view of the nozzle 304. In the embodiment shown in FIG. 4, the nozzle 304 is a ball nozzle having a truncated substantially spherical ball portion 402 and a lip 324. The ball portion 402 has a sufficiently frictive surface to permit rollers in contact with the surface to rotate the nozzle 304. As will be discussed below, in some embodiments, the lip 324 may include a conductive material or may be surrounded by a conductive O-ring.

The nozzle 304 includes an inlet (not shown in FIG. 4) and an outlet 322. In the embodiment shown in FIG. 4, the nozzle 304 may be rotated in the inner body (not shown in FIG. 4) to direct the air into the office space in a selected direction.

It will be understood that other nozzles could be used to direct air into an office space. For example, a truncated substantially cylindrical nozzle could be used (with appropriate alterations to the inner body to accommodate such a nozzle) if only one rotational degree of freedom in needed.

Figure 5:
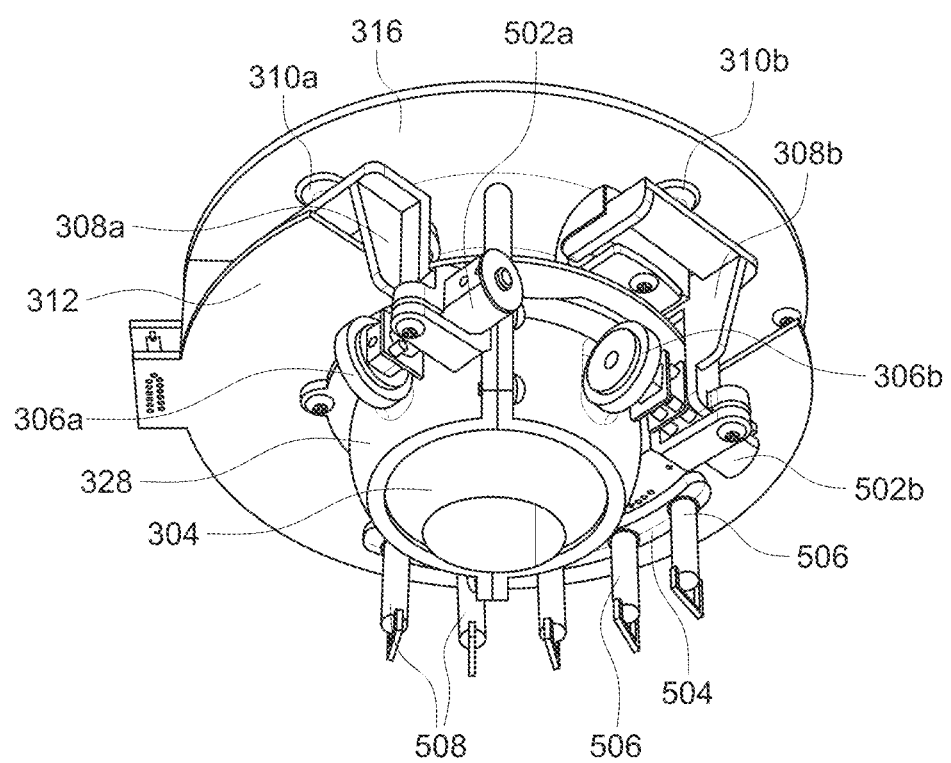
FIG. 5 shows a view of interior portions of the inner body, including roller wheels and an indicator.

FIG. 5 provides a clear view of interior portions of the inner body including the nozzle 304, the circuit board 312, the isolation panel 316, the two roller wheels 306a and 306b, the two actuators 502a and 502b, the two pivots 308a and 308b, the two springs 310a and 310b, and the nozzle cage 328. Additionally, the circuit board 312 is shown as having an indicator 504, which includes a plurality of light-emitting diodes (LEDs) 506, and a plurality of light pipes 508, which conduct light from the LEDs 506 to a faceplate (not shown in FIG. 5) of the inner body that is visible from the office space.

As can be seen, the nozzle cage 328 includes openings so that the roller wheels 306a and 306b can directly contact the surface of the nozzle 304. Friction between the roller wheels 306a and 306b and the surface of the nozzle 304 permits the roller wheels 306a and 306b to rotate the nozzle 304 about two axes. The roller wheels 306a and 306b are disposed on pivots 308a and 308b, which impel the roller wheels 306a and 306b onto the surface of the nozzle 304 with a spring force supplied by the springs 310a and 310b. The springs 310a and 310b are selected so that they provide enough force to permit friction between the roller wheels and the nozzle 304 to rotate the nozzle, but also permit the nozzle to be rotated by hand to point in the desired direction.

The actuators 502a and 502b, which may be small electric motors, such as stepper motors, rotate the roller wheels 306a and 306b and are controlled by circuitry on the circuit board 312. In operation, both roller wheels 306a and 306b operate at the same time, effectively rotating the nozzle 304 about a first axis that runs between the roller wheels 306a and 306b, and a second axis that is perpendicular to the first axis. When the roller wheels 306a and 306b turn in the same direction, the nozzle 304 is rotated about the second axis. When the roller wheels 306a and 306b turn in opposite directions, then the nozzle 304 is rotated about the first axis. This effectively provides the nozzle 304 with two rotational degrees of freedom, so that the nozzle 304 may be rotated to point the outlet of the nozzle 304 in any direction within the range of rotation of the nozzle 304. As will be seen below, the range of rotation of the nozzle 304 is limited by the lip (not shown in FIG. 5) of the nozzle 304 contacting a portion of the circuit board 312.

In the embodiment shown in FIG. 5, the indicator 504 includes five individually controllable LEDs 506, which are controlled by circuitry on the circuit board 312. As will be described in greater detail below, the LEDs 506 may be used to display a variety of information, such as information about the amount of airflow, information about the status of the outlet device, and/or information identifying the outlet device in a space in which there are several such devices within range of an application configured to control the outlet device. It will be understood that although FIG. 5 shows an indicator 504 having five LEDs 506, more or fewer LEDs could be used, and the LEDs may be of any conventional variety, such as red, green, white, amber, blue, or multi-color LEDs. Additionally, the LEDs may convey information by more than just their on/off state. For example, information may be conveyed by color, brightness, frequency of flashing, etc. It will also be understood that some embodiments may include different types of indicators, which could include multi-LED displays, multi-segment LED displays, LCDs, e-ink displays, laser projection, or any other conventional electronic display type.

Figure 6:
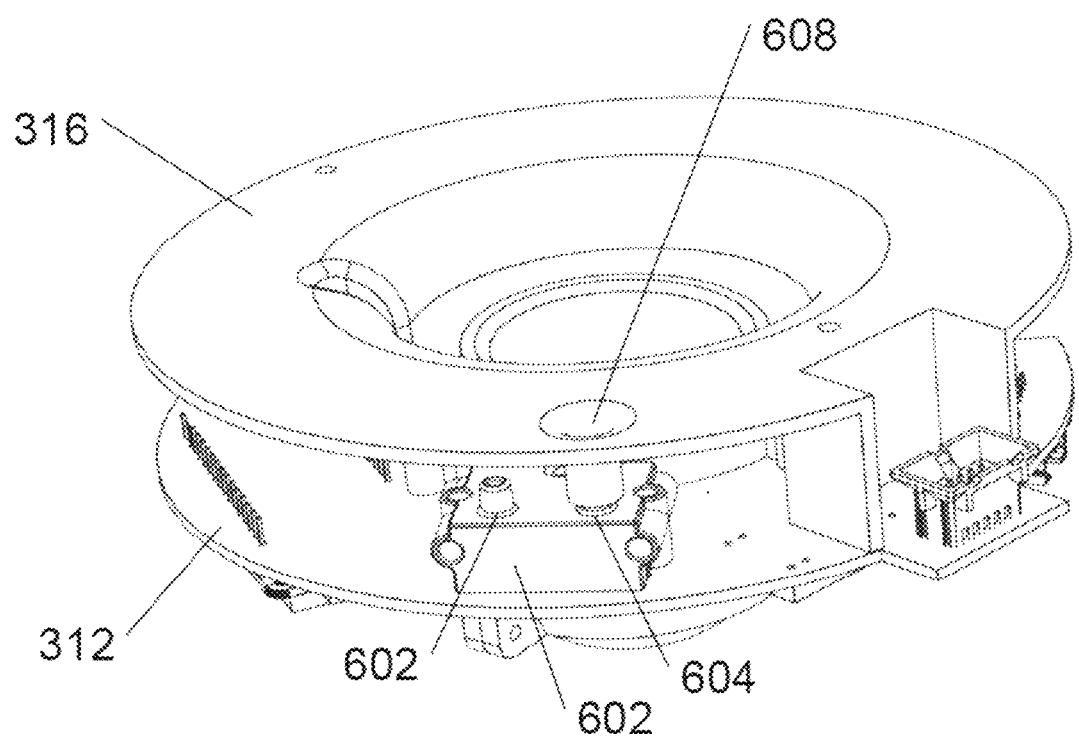
FIG. 6 shows a view of interior portions of the inner body, including a pressure sensor.

FIG. 6 shows a view of interior portions of the inner body, including the circuit board 312, and the isolation panel 316. In the view shown in FIG. 6, a pressure sensor 602 disposed on the circuit board 312 can be seen. In some embodiments, the pressure sensor 602 may be a differential pressure sensor, such as an SDP800 series differential pressure sensor manufactured by Sensirion AG, of Staefa, Switzerland, or other conventional differential pressure sensors. Such a differential pressure sensor measures a pressure difference between two ports, which are commonly referred to as a low port and a high port.

In the embodiment shown in FIG. 6, the high port 604 of the pressure sensor 602 reads the pressure in the airflow chamber of the inner body. This is done through a tube 608 in the isolation panel 316 that connects the high port 604 to the interior of the airflow chamber. The low port 606 of the pressure sensor 602 reads the ambient pressure beneath the isolation panel 316. The differential pressure measurement between the high port and the low port can be used to determine the airflow through the airflow chamber of the inner body.

In some embodiments, the airflow rate may be determined from the differential pressure readings by use of well-known techniques, such as application of Bernoulli's equation, and information on the cross-sectional area of the airflow chamber. In some embodiments, a table-based approach may be used, in which a predetermined table is used to look up a rate of airflow based on the temperature-compensated differential pressure reading. Using this method, it is possible to simplify the determination, since factors like the angle of the high port of the pressure sensor to the direction of airflow are not needed, since the predetermined table already accounts for such factors.

It will be understood that in some embodiments, other types of pressure or flow sensors could be used, such as a FLOWSTAR pressure sensor, manufactured by Johnson Controls, Inc., of Milwaukee, Wis., under the ENVIRO-TEC brand name, and described in U.S. Pat. No. 5,481,925. Previously-known anemometers could also be used to measure the flow rate through the inner body.

An airflow rate determined in some embodiments through use of the pressure sensor 602 may be used by circuitry on the circuit board 312 to provide information to a user either via an indicator (not shown in FIG. 6) on a visible portion of the inner body or over a network, or both. Additionally, the airflow rate reading may be used by the circuitry on the circuit board 312 to control the damper actuator (not shown in FIG. 6) to rotate the damper (not shown in FIG. 6), causing the airflow through the inner body to increase or decrease based on the position of the damper.

Figure 7A:
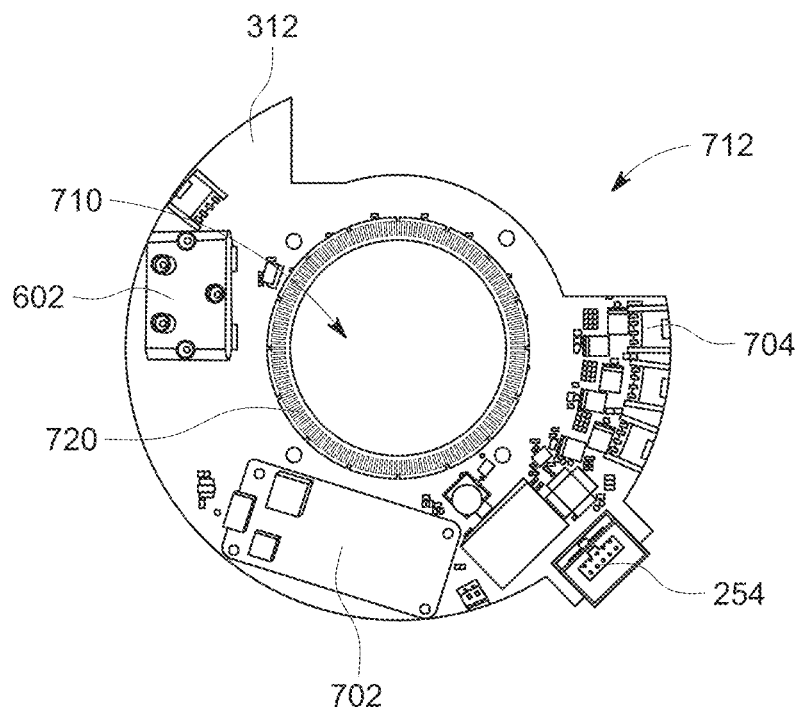
FIGS. 7A-7B show views of a circuit board that is used in a cooling and ventilation outlet according to the disclosure.
Figure 7B:
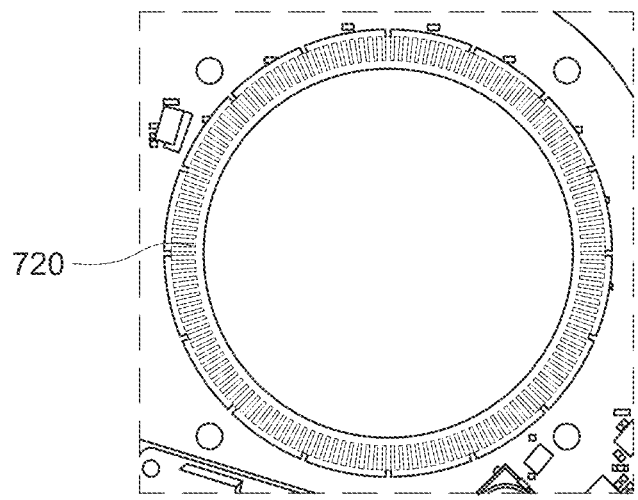

Referring now to FIGS. 7A and 7B, more detailed views of the circuit board 312 are described. As shown in FIG. 7A, the circuit board 312 may include a network interface 702, which may be a wired, wireless, and/or optical network interface, or any other conventional network interface. The circuit board 312 may also include the pressure sensor 602, connectors 704 for connecting to actuators or additional sensors, and the electrical connector 254. The circuit board 312 may also include circuitry 706, which may include one or more microcontrollers or other processors, and a memory containing instructions configured to control the nozzle actuators and the damper actuator, to control the indicator, to accept sensor readings from the pressure sensor and any additional sensors, and to accept commands over the network.

In the embodiment of FIGS. 7A and 7B, the circuit board 312 is "donut-shaped," meaning that it has an opening 710 that is configured to be placed in a position surrounding the nozzle (not shown in FIGS. 7A and 7B). Additionally, a cut-out region 712 at one edge of the circuit board 312 is configured to accommodate placement and movement of the pivots (not shown in FIGS. 7A and 7B). This general configuration permits placement of the circuit board 312 in a position within the inner body where the circuit board does not require any "extra" space within the inner body. Thus, the "donut-shaped" configuration of the circuit board 312 assists in providing a compact or space-efficient design for the inner body.

The circuit board 312 also includes a set of open circuits 720 that circumferentially surround the opening 710. FIG. 7B shows a more detailed view of the open circuits 720. In the embodiment shown in FIGS. 7A and 7B, sixteen such open circuits surround the opening 710, though it will be understood that more or fewer such circuits could be used. Each of the open circuits 720 is used to detect when the nozzle has reached its maximum extent of rotation in a particular direction. This condition is detected by the lip of the nozzle (not shown in FIGS. 7A and 7B) coming into contact with one of the circuits 720. In some embodiments, the lip of the nozzle includes a conductive material that closes one or more of the circuits 720 when the conductive lip of the nozzle comes into contact with one or more of the circuits 720. This condition is detected by the circuitry 706, which may use the information on which ones of the circuits 720 are closed to determine the approximate direction in which the nozzle is pointing, as well as to determine that the nozzle has reached the maximum extent of its rotation in that direction. In this way, the circuits 720 effectively provide a limit detector for the nozzle.

Figure 8:
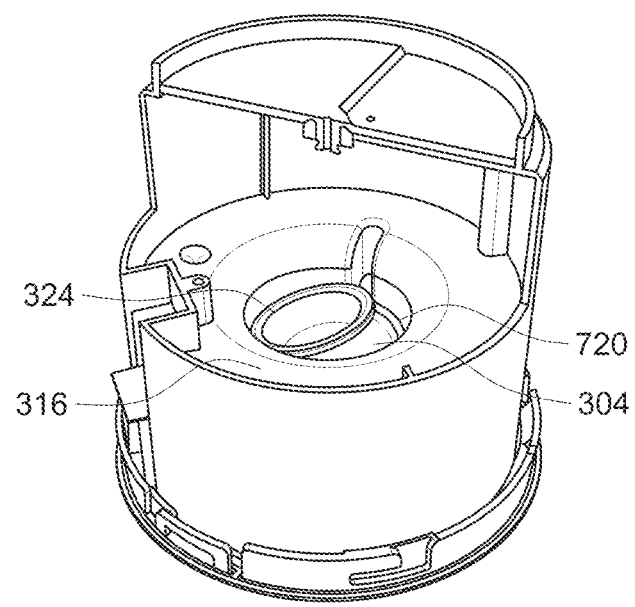
FIG. 8 shows the use of circuits on the circuit board as a rotational limit detector for the nozzle.

FIG. 8 illustrates the use of circuits 720 as a limit detector. As can be seen in FIG. 8, the nozzle 304 is rotated to the extent that the lip 324 of the nozzle 304 is in contact with a portion of the circuits 720 that is left exposed by the isolation panel 316. In the embodiment shown in FIG. 8, the lip 324 includes a conductive O-ring or a conductive material, which closes one or more of the circuits 720, signaling that the nozzle 304 has reached the maximum extent of its rotation, as well as the approximate direction in which the nozzle 304 is pointing.

It will be understood that although FIG. 8 shows that the lip 324 includes a conductive material (which may be formed within the lip 324 itself or may be in the form of a conductive O-ring on the lip 324) that directly contacts one or more of the circuits 720 to close the circuits, other arrangements could be used. For example, in some embodiments, a conductive flexible sheet may be mounted above the circuits 720, such that the lip 324 of the nozzle 304 presses on the conductive flexible sheet to close one or more of the circuits 720. In such an arrangement, the lip 324 need not itself be conductive.

Figure 9A:
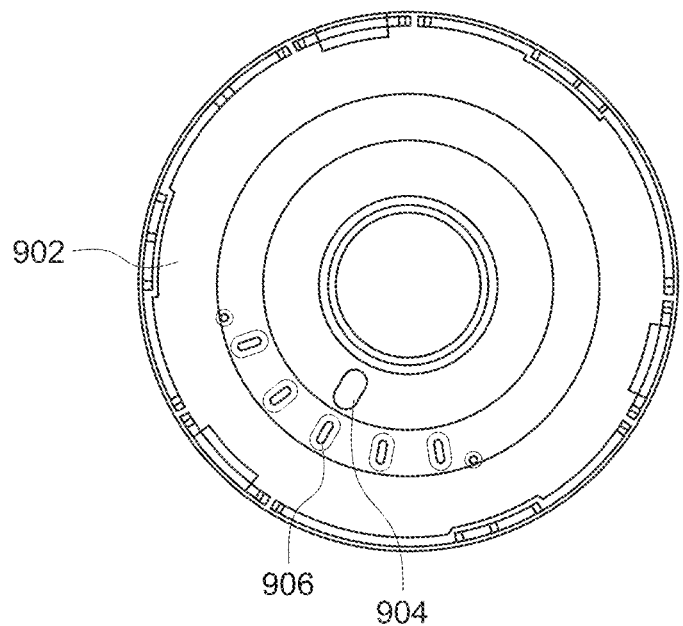
FIGS. 9A-9B show a faceplate of the inner body.
Figure 9B:
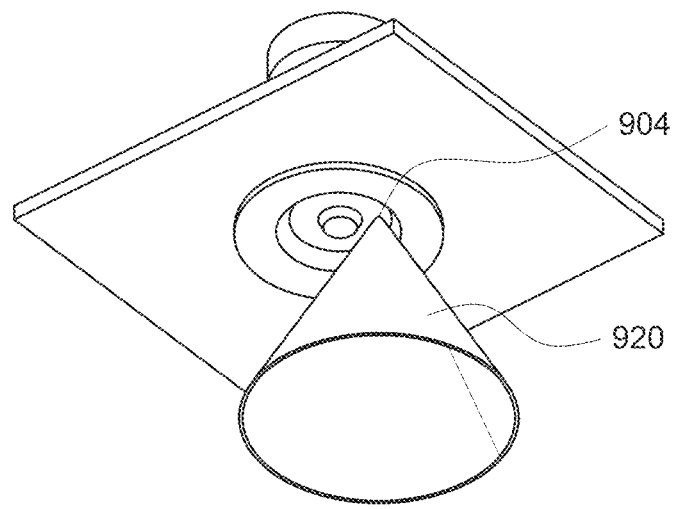

FIGS. 9A and 9B show a faceplate 902 of the inner body. The faceplate 902 is generally visible within the office space in which the disclosed cooling and ventilation outlet is used. In FIG. 9A, it can be seen that the faceplate 902 includes a sensor 904 and a visible indicator 906. In the embodiment of FIG. 9A, the sensor 904, and the visible indicator 906 are disposed in positions on the faceplate 902 that can be used to orient the inner body during installation.

In the embodiment of FIG. 9A, the visible indicator 906 is made up of five individually controllable elements, which may be connected to LEDs through light pipes, as discussed above. As also discussed above, the visible indicator 906 may be used to display information on a rate of airflow and/or information used to identify an individual cooling and ventilation outlet to a user so that a user may select which cooling and ventilation outlet she wishes to control.

The sensor 904 may be, for example, an infrared sensor. As shown in FIG. 9B the sensor 904 may be configured so that its monitored area is effectively a cone-shaped area 920 that represents the area to which the cooling and ventilation outlet is directed. The sensor 904 may be configured to detect the presence of a person in the area, so that the cooling and ventilation outlet may be turned off to save energy if there is no one present in the area that is covered by the cooling and ventilation outlet, and may be immediately re-activated when a person is present in the area for at least a predetermined period. Detection of the presence of persons (or of a particular person) in a workspace monitored by the sensor 904 may also be recorded and, for example, reported to management or other administrators, e.g., for time recording and productivity monitoring purposes.

The sensor 904 may also be configured to detect a body temperature of any persons present in the area covered by the sensor 904. If a person is detected with a body temperature above a predetermined threshold in the area monitored by the sensor 904, this information may be sent over the network to health and safety personnel, security, and/or management so that the potentially ill person or persons may be quickly isolated and/or removed. Additionally, in some embodiments, when a person is detected with such an elevated body temperature, the visible indicator 906 may provide a visible (and/or audible) warning to let others in the office space know that they should not approach the person, and to warn the person with the high body temperature and any other persons detected in the area monitored by the sensor 904 to remain in place until health and safety and/or security personnel arrive, to record who is present for contact tracing purposes. This warning could also be provided through, e.g., wireless communications with mobile devices carried by people in the immediate area.

Although an infrared sensor should be able to determine body temperature as well as presence, in some embodiments, a temperature sensor and a presence detector may be included separately in the sensor 904. It will also be understood that other types of sensors could be used, such as arrays of infrared sensors, visible-light or infrared cameras or video cameras, or other known sensors. It will also be understood that although the visible indicator 906 is shown as having five elements, more or fewer elements could be used. It will also be understood that some embodiments may include different types of indicators, which could include multi-LED displays, multi-segment LED displays, LCDs, e-ink displays, laser projection, or any other conventional electronic display type. In some embodiments, the visible indicator 906 could also include an audio output.

Figure 10:
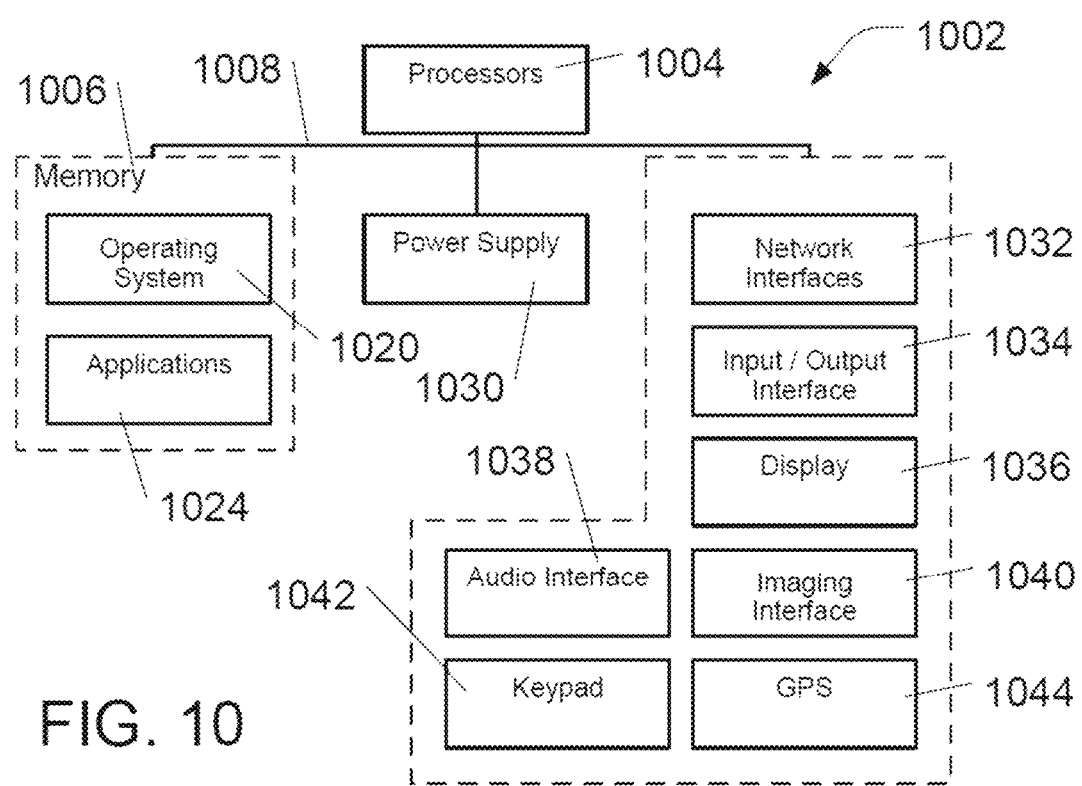
FIG. 10 shows a block diagram of an illustrative mobile computing device.

The cooling and ventilation outlet of the disclosure is generally controlled through the use of a software application. This software application may execute, for example, on a mobile computing device, such as a smartphone. However, other computing devices, such as a desktop computer, a laptop computer, a tablet, a smartwatch, a wearable computer, a personal digital assistant, a handheld personal computer, an electronic tag, an embedded computing device, or an implanted computing device could also be used. For purposes of illustration, FIG. 10 shows a block diagram of an illustrative mobile computing device (in FIG. 10, an illustrative smartphone).

The smartphone 1002 may include one or more processors 1004 in communication with a memory 1006 via a bus 1008. The memory 1006 may include random access memory (RAM), read-only memory, non-volatile memory such as flash memory, and/or other storage means. The memory 1006 illustrates an example of a non-transitory computer-readable storage medium for storage of information such as computer-readable instructions, data structures, program modules, and/or other data. The memory 1006 stores an operating system 1020 for controlling the operation of the smartphone 1002. Additionally, the memory 1006 may store applications 1024 and/or other data.

The applications 1024 may include computer-executable instructions which, when executed by the one or more processors 1004 may cause the smartphone 1002 to transmit, receive, and/or otherwise process data relating to user applications, or to perform other device functions, such as telecommunications, messaging, playing audio, displaying video, and/or interacting with a user. Among the applications 1024 may be an application for controlling one or more cooling and ventilation outlets, as disclosed herein. Other examples of applications may include calendars, search programs, email clients, instant messaging applications, contact managers, task managers, security applications, internet browsers, networking applications, games, and so forth.

The smartphone 1002 may also include a power supply 1030, one or more network interfaces 1032, an input/output interface 1034, a display 1036, an audio interface 1038, an imaging interface 1040, a keypad 1042, and a global positioning systems (GPS) receiver 1044.

The power supply 1030 provides power to the smartphone 1002 and may include a rechargeable or non-rechargeable battery. Power may also be provided by an external power source (not shown), such as an AC adapter or a powered docking cradle that supplements and/or recharges a battery.

The one or more network interfaces 1032 may include circuitry for communicating over one or more networks, and is constructed for use with one or more communication protocols and technologies including, but not limited to GSM, CDMA, TDMA, 4G and/or 5G cellular and data communication protocols, WiFi, WiMax, and/or any other conventional wireless communication protocols.

The input/output interface 1034 may be used for communicating with external devices, such as a headset, an external keyboard, or other input or output devices. The input/output interface 1034 may be configured to use one or more communication technologies, such as USB, infrared, BLUETOOTH, radio frequency identification (RFID), near field communication (NFC), etc.

The display 1036 may be a liquid crystal display (LCD), gas plasma, light-emitting diode (LED), or any other type of display used with a computing device. The display 1036 may also include a touch screen arranged to receive input from an object such as a stylus or one or more digits of a human hand.

The audio interface 1038 is configured to produce and receive audio signals. The audio interface 1038 may be coupled to a speaker 1050 and microphone 1052. The imaging interface 1040 is arranged to produce and receive image data signals, such as photographs, video, and the like. For example, the imaging interface 1040 may include one or more cameras or other image-capture elements.

The keypad 1042 may include any input device arranged to receive input from a user. For example, keypad 1042 may include one or more pushbuttons or a keyboard.

The GPS receiver 1044 can determine the physical coordinates of the smartphone 1002 on the surface of the Earth, which typically outputs a location as latitude and longitude values. The GPS receiver 1044 can also employ other geo-positioning mechanisms or information such as a MAC address or IP address to further determine the physical location of the smartphone 1002. It will also be understood that although the GPS receiver 1044 is described herein as being associated with the global positioning system (GPS) currently operated by the United States Space Force, other similar satellite-based positioning and navigation systems, such as GLONASS, BeiDou, Galileo, QZSS, and/or NavIC could be used either in addition to or as an alternative to GPS. Some of these alternative satellite-based positioning and navigation systems may be newer than GPS and may provide more accurate location information.

Figure 11:
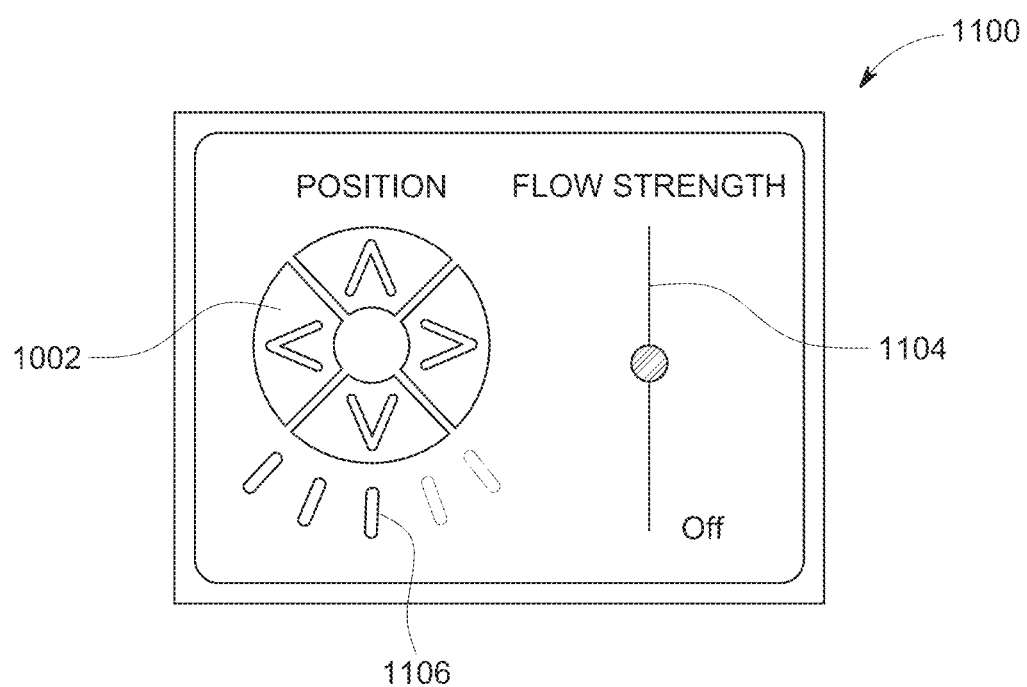
FIG. 11 shows an example user interface of an application configured to execute on a computing device to control a cooling and ventilation outlet in accordance with the disclosure.

FIG. 11 shows an example user interface of an application configured to execute on a computing device as described above to control a cooling and ventilation outlet in accordance with the disclosure. The user interface 1100 includes a position control 1102, a flow control 1104, and an indicator status display 1106.

The position control 1102 may be used to control the direction in which the outlet of the nozzle provides air. In the embodiment of FIG. 11, the position control 1102 includes four direction controls that provide the user with the ability to send commands to rotate the nozzle about a first and a second axis. It will be appreciated that many other direction or position controls could be used in other embodiments. For example, the position control 1102 may provide the user with an option to tap a position within a circle that represents the area over which the nozzle can be rotated, and the application could then automatically generate commands to move the nozzle to point approximately at that position. In systems where a reasonably precise rotation of the nozzle is only determined when the nozzle is at a maximum extent of its rotation, it may be helpful to rotate the nozzle in an arbitrary direction until the maximum extent of rotation is reached. Once this is done, then the position of the nozzle is known and can be adjusted to point at any location within a circle that has been selected by the application user.

The flow control 1104 permits a user to control the airflow through a cooling and ventilation outlet. In the embodiment shown in FIG. 11, this is done using a slider control, though it will be understood that other conventional user interface elements could also be used. It should be noted that in some embodiments, the flow control 1104 may permit the user to control the airflow relative to its current state. In such embodiments, the user is effectively only indicating that the flow strength should be increased or decreased. In some embodiments, the flow control 1104 may permit the user to specify a flow rate as a percentage of the maximum flow rate of the cooling and ventilation outlet. In still further embodiments, the flow control 1104 may permit the user to specify a flow rate in absolute terms—e.g., in particular values for the number of cubic feet of air per minute (CFM). This can be done by using measurements of the airflow from the pressure sensor (not shown in FIG. 11) in the inner body (not shown in FIG. 11), and increasing or decreasing the airflow, e.g., by controlling the damper (not shown in FIG. 11) until the desired absolute airflow value is reached. In some embodiments, any of the options discussed above may be available to the user, depending on the settings of the application.

The indicator status display 1106 shows the status of the indicator for the cooling and ventilation outlet that is currently being controlled by the user interface 1100. In the embodiment shown in FIG. 11, the indicator status display 1106 includes five elements, corresponding to the five elements or LEDs (not shown in FIG. 11) of some embodiments of the inner body (not shown in FIG. 11). It will be understood that the configuration of the indicator status display 1106 may vary, according to the type of indicator that is being used on the inner body of the cooling and ventilation outlet that is being controlled.

The indicator status display 1106 may be used to display substantially the same information that is displayed on the indicator on the inner body. As discussed above, this may include, for example, information on the current airflow rate, and/or information on the identity of the outlet that is currently being controlled by the application. In some embodiments, the indicator status display may also be used to select a cooling and ventilation outlet to be controlled using the user interface 1100. In such embodiments, outlets that are within a predetermined range of a computer or mobile device that is being used may display different patterns of lights or elements on their indicator. By using the elements of the indicator status display 1106 as inputs, the user can input the pattern that is displayed by the indicator on the outlet that she wishes to control using the interface 1100.

It will be understood that determining which outlet should be controlled by a user can be handled in a variety of ways in various embodiments. In some embodiments, identifying an outlet to be controlled is handled by determining a subset of the outlets that are near the user's computer or mobile device based on radio signal strengths of signals, such as wireless network or BLUETOOTH signals between the computing device and outlets. The indicators on each outlet that is within a predetermined distance based on radio signal strength can then display a different output. The user can then use the output of the selected outlet to select the outlet that is to be controlled. The output of each indicator on each of the outlets can be based on a variety of factors. For example, the output could be based on a random pattern, or the radio signal strength (e.g., so the user can select an outlet with a suitable signal strength), or on many other factors, either alone or in combination.

In addition to using information displayed on the indicator of the outlets to permit a user to select an outlet to be controlled by the interface 1100, a variety of other methods could be used. For example, any visible identification code on the outlets could be used to select an outlet, whether or not that identification code is displayed on the indicator. For example, each outlet could have a visible barcode or QR code associated with it either displayed on a controllable indicator, or placed onto (e.g., by printing, etching, or engraving) or attached to the outlet, e.g., as a sticker or other means of permanently or semi-permanently affixing a code to the faceplate of an outlet. These codes can then be read, e.g., by a camera on the user's smartphone or mobile device to select an outlet.

In some embodiments, an outlet may be associated with a particular location in an office space. For example, a particular work area or desk may be associated with a particular cooling and ventilation outlet. Methods that take advantage of this association may be used to select the outlet that is controlled by the interface 1100. For example, office furniture, such as a work station or desk corresponding to a particular outlet, may include a wireless device charging station. When the user places her wireless device in the charging station, the outlet corresponding to the office furniture that includes the charging station may be automatically selected. Some embodiments may use a similar method, in which office furniture corresponding to a particular outlet includes an RFID tag that is associated with that outlet. When used at the desk or workstation that includes the RFID tag, the user's computing device or smartphone may wirelessly detect the RFID tag and select the outlet to be controlled based on the information in the RFID tag. It will be understood that when particular office locations or furniture are associated with a particular outlet, markings, such as barcodes or QR codes, placed in the location and/or on the office furniture could also be used to select the outlet associated with that location or furniture.

More complex or sophisticated methods for identifying an outlet to be controlled may also be used in some embodiments. For example, if the inner bodies of the outlets include video cameras or infrared sensor arrays, then motions or gestures made by the user may be used to select an outlet. Previously-known machine vision and machine learning techniques may be used to recognize motions or gestures, and to determine which of several outlets has video or sensor data that most closely corresponds to an expected selection motion or gesture. In some embodiments, the outlets may be directly controlled by user motions or gestures, without using a computing device or user interface to control the outlets. As with selection, known machine vision and machine learning techniques can be used to recognize user gestures or motions.

It will further be understood that an application for controlling cooling and ventilation outlets may include many other features. For example, it may be desirable to allow outlets to be controlled only by specific users, such as employees, maintenance staff, management, or members of a particular department or other subdivision of a company. Accordingly, outlets may be configured to accept commands only from particular computing devices. In systems using, e.g., video cameras to accept input, know facial recognition techniques could be used to limit the users who can issue commands to outlets.

There is thus disclosed a cooling and ventilation outlet including a shell configured to connect to an HVAC duct, the shell including a first connector component and an inner body including a second connector component configured to connect to the first connector component to secure the inner body within the shell such that air from the HVAC duct passes through the inner body. The inner body may include: an airflow chamber configured to direct air from the HVAC duct through the inner body; a directable air output nozzle disposed at an output end of the airflow chamber; a first actuator configured to control a direction of the directable air output nozzle; an adjustable damper; a second actuator configured to control airflow through the inner body by actuating the adjustable damper; an indicator disposed on a visible portion of the inner body, wherein the indicator may include at least one controllable visual element; a pressure sensor configured for use in determining airflow through the inner body; and circuitry including a network interface, wherein the circuitry may be configured to accept commands over a network, to accept readings from the pressure sensor, and to control the first actuator, the second actuator, and the indicator.

Implementations may include one or more of the following features: The adjustable damper is rotatably disposed on a surface that is substantially perpendicular to a direction of airflow through the inner body. The network interface is configured to accept commands over a network from a computing device running an application. The network interface is configured to accept commands only from at least one predetermined computing device. The application is configured to permit a user of the computing device to specify at least an airflow rate and an airflow direction for the cooling and ventilation outlet. The network interface is selected from a set that may include: a wired network interface, a wireless network interface, and an optical network interface. The indicator is disposed on the visible portion of the inner body in a position that indicates an orientation of the cooling and ventilation outlet. The indicator is configured to identify the cooling and ventilation outlet to a user. The indicator is configured to display a measure of airflow through the inner body. The indicator may include a plurality of LEDs. The circuitry is disposed on a "donut-shaped" circuit board that is configured to surround the airflow chamber. The inner body further may include an isolation panel disposed in the airflow chamber over the donut-shaped circuit board, the isolation panel configured to protect the circuit board from dust accumulation, and to direct air in the airflow chamber toward the directable air output nozzle. The cooling and ventilation outlet may include an occupancy sensor operatively connected to the circuitry, the occupancy sensor configured to detect the presence of a person in a space that is served by the cooling and ventilation outlet. The circuitry is configured to reduce airflow to save energy when the occupancy sensor indicates that no person is present in the space that is served by the cooling and ventilation outlet. The circuitry is configured to communicate occupancy information collected through the occupancy sensor to an administrator. The cooling and ventilation sensor may include a temperature sensor operatively connected to the circuitry, the temperature sensor configured to detect a body temperature of a person in a space that is served by the cooling and ventilation outlet. The output nozzle may include a ball nozzle. The first actuator may include two motors driving two roller wheels configured to move the ball nozzle. Each of the two roller wheels is disposed on a pivot such that each of the two roller wheels is impelled to contact a surface of the ball nozzle by a spring force applied to the pivot, such that the ball nozzle can be positioned both manually and by the movement of the two roller wheels. The two roller wheels are disposed orthogonally to each other and are configured to move simultaneously, such that the ball nozzle is rotated about a first axis diagonal to the roller wheels when both roller wheels are turned in opposite directions, and about a second axis orthogonal to the first axis when the two roller wheels are turned in the same direction. The inner body further may include a limit detector configured to detect when the ball nozzle has reached a limit of its movement. The limit detector may include a conductive O-ring attached to the ball nozzle and a plurality of circuits arranged circumferentially around the ball nozzle, the limit detector configured such that when the ball nozzle has reached a predetermined limit to its movement, the conductive O-ring connects positive and negative leads for one of the circuits, thereby closing the circuit. Closing a circuit by the conductive O-ring is detected by the circuitry, and which one of the plurality of circuits is closed indicates the directionality of the ball nozzle. The limit detector may include a plurality of circuits arranged circumferentially around the ball nozzle and a conductive flexible sheet mounted above the plurality of circuits, the limit detector configured such that when the ball nozzle has reached a predetermined limit to its movement, a lip of the ball nozzle presses on the conductive flexible sheet to close at least one of the plurality of circuits. The inner body is powered via a wired electrical connection. The wired electrical connection may include power-over-ethernet. The inner body further may include a battery that powers the inner body. The inner body further may include a fan disposed in the airflow chamber, the fan configured to increase airflow at some times, and at other times to convert airflow driven through the airflow chamber via the HVAC duct by a central fan into electrical current to charge the battery. Implementations of the described techniques may include hardware, a method or process, or computer software that may be encoded in a memory or on another non-transient computer-readable medium.

There is further disclosed a method of controlling an individually adjustable cooling and ventilation outlet in an office setting, including a plurality of individually adjustable cooling and ventilation outlets. The method includes providing an individually adjustable cooling and ventilation outlet that may include a directable air output nozzle controlled by a first actuator, an adjustable damper controlled by a second actuator, a pressure sensor configured for use in determining airflow through the individually adjustable cooling and ventilation outlet, an indicator disposed on a visible portion of the individually adjustable cooling and ventilation outlet, and circuitry including a network interface, the circuitry configured to accept commands over a network, to accept readings from the pressure sensor, and to control the first actuator, the second actuator, and the indicator. The method also includes providing an application that executes on a computing device and that enables the computing device to communicate over the network with individually adjustable cooling and ventilation outlets; selecting one outlet of the plurality of individually adjustable cooling and ventilation outlets to be controlled by the computing device; displaying on the computing device, by the application, a position control and a flow control; receiving from a user of the computing device at least one of a position input and/or a flow control input; and sending a command over the network from the application to the selected outlet to cause the circuitry to control the first actuator according to the position input and/or to control the second actuator according to the flow control input.

Implementations may include one or more of the following features. The computing device is selected from: a desktop computer, a laptop computer, a smartphone, a tablet, a smartwatch, a wearable computer, a personal digital assistant, a handheld personal computer, an electronic tag, an embedded computing device, and an implanted computing device. Selecting one outlet may include: determining a subset of the plurality of individually adjustable cooling and ventilation outlets that are near the computing device based on radio signal strengths of signals between the computing device and individually adjustable cooling and ventilation outlets; displaying a different output on the indicator of each outlet in the subset; receiving from the user of the computing device a user selection based on the output of a desired outlet from the subset; and selecting the outlet that corresponds to the user selection. Displaying a different output on the indicator of each outlet in the subset may include displaying an output based, at least in part, on a radio signal strength. Displaying a different output on the indicator of each outlet in the subset may include displaying an output based, at least in part, on a random number. The indicator may include a plurality of LEDs, and displaying a different output on the indicator of each outlet in the subset may include displaying different patterns of LEDs. Each individually adjustable cooling and ventilation outlet further may include a visible identification code, and selecting one outlet may include receiving a user selection based on the visible identification code. The visible identification code may include a QR code. Office furniture corresponding to each individually adjustable cooling and ventilation outlet includes a wireless device charging station, and selecting one outlet may include selecting the outlet that corresponds to the charging station on which the user sets the computing device. Office furniture corresponding to each individually adjustable cooling and ventilation outlet includes an RFID tag, and selecting one outlet may include selecting the outlet that corresponds to an RFID tag that is detected by the computing device. Implementations of the described techniques may include hardware, a method or process, or computer software that may be encoded in a memory or on another non-transient computer-readable medium.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested parties. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. Although the title of the invention is "PERSONAL AIR SYSTEM FOR OFFICES," this title is not intended to be limiting and instead refers to particular examples described herein. Similarly, the field of the invention and description of related art are not intended to be limiting. In addition, many modifications will be appreciated by those skilled in the art to adapt a particular instrument, situation, or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cooling and ventilation outlet configured to connect to an HVAC duct, the cooling and ventilation outlet comprising:
   an airflow chamber configured to direct air from the HVAC duct through the cooling and ventilation outlet;
   a directable air output nozzle disposed at an output end of the airflow chamber;
   a first actuator configured to control a direction of the directable air output nozzle;
   an adjustable damper;
   a second actuator configured to control airflow through the cooling and ventilation outlet by actuating the adjustable damper;
   circuitry including a network interface, the circuitry configured to accept commands over a network and to control the first actuator and the second actuator;
   wherein the circuitry is disposed on a circuit board that is configured to surround the airflow chamber;
   wherein the cooling and ventilation outlet further comprises an isolation panel disposed in the airflow chamber over the circuit board, the isolation panel configured to protect the circuit board from dust accumulation and to direct air in the airflow chamber toward the directable air output nozzle.

2. The cooling and ventilation outlet of claim 1, further comprising an occupancy sensor operatively connected to the circuitry, the occupancy sensor configured to detect the presence of a person in a space that is served by the cooling and ventilation outlet.

3. The cooling and ventilation outlet of claim 1, further comprising a temperature sensor operatively connected to the circuitry, the temperature sensor configured to detect a body temperature of a person in a space that is served by the cooling and ventilation outlet.

4. The cooling and ventilation outlet of claim 1, wherein the output nozzle comprises a ball nozzle.

5. The cooling and ventilation outlet of claim 1, wherein the cooling and ventilation outlet further comprises a battery that powers the cooling and ventilation outlet.

6. The cooling and ventilation outlet of claim 1 further comprising an inner body.

7. The cooling and ventilation outlet of claim 1 further comprising a shell and an inner body, the shell being the part of the cooling and ventilation outlet configured to connect to an HVAC duct, the inner body being attachably contained within the shell.

8. The cooling and ventilation outlet of claim 1, wherein the network interface is configured to accept commands over a network from a computing device running an application.

9. The cooling and ventilation outlet of claim 8, wherein the application is configured to permit a user of the computing device to specify at least an airflow rate and an airflow direction for the cooling and ventilation outlet.

10. The cooling and ventilation outlet of claim 1, wherein the network interface is selected from the set consisting of: a wired network interface, a wireless network interface, and an optical network interface.

11. The cooling and ventilation outlet of claim 1, further comprising an indicator disposed on a visible portion of the cooling and ventilation outlet, the indicator comprising at least one controllable visual element;
   wherein the indicator is configured to identify the cooling and ventilation outlet to a user.

12. The cooling and ventilation outlet of claim 1, further comprising an indicator disposed on a visible portion of the cooling and ventilation outlet, the indicator comprising at least one controllable visual element;
wherein the indicator is configured to display a measure of airflow through the cooling and ventilation outlet.

13. The cooling and ventilation outlet of claim 1 further comprising a pressure sensor configured for use in determining airflow through the cooling and ventilation outlet; and the circuitry configured to accept readings from the pressure sensor.

14. A cooling and ventilation outlet configured to connect to an HVAC duct, the cooling and ventilation outlet comprising:
an airflow chamber configured to direct air from the HVAC duct through the cooling and ventilation outlet
a directable air output nozzle disposed at an output end of the airflow chamber;
a first actuator configured to control a direction of the directable air output nozzle;
an adjustable damper;
a second actuator configured to control airflow through the cooling and ventilation outlet by actuating the adjustable damper;
circuitry including a network interface, the circuitry configured to accept commands over a network and to control the first actuator and the second actuator;
wherein the circuitry is disposed on a circuit board that is configured to surround the airflow chamber;
wherein the first actuator comprises two motors driving two roller wheels configured to move the ball nozzle;
wherein each of the two roller wheels is disposed on a pivot such that each of the two roller wheels is impelled to contact a surface of the ball nozzle by a spring force applied to the pivot, such that the ball nozzle can be positioned both manually and by movement of the two roller wheels.

15. The cooling and ventilation outlet of claim 14, wherein the adjustable damper is rotatably disposed on a surface that is substantially perpendicular to a direction of airflow through the cooling and ventilation outlet.

16. The cooling and ventilation outlet of claim 14, wherein the circuit board is configured to substantially circumscribe the airflow chamber.

17. The cooling and ventilation outlet of claim 16, wherein the circuit board that is configured to surround the airflow chamber is donut-shaped.

18. The cooling and ventilation outlet of claim 17, wherein the donut-shaped circuit board includes a cut-out region at one edge of the circuit board.

19. The cooling and ventilation outlet of claim 18, wherein the cut-out region at one edge of the circuit board is configured to accommodate placement and movement of pivots.

20. A cooling and ventilation outlet configured to connect to an HVAC duct, the cooling and ventilation outlet comprising:
an airflow chamber configured to direct air from the HVAC duct through the cooling and ventilation outlet;
a directable air output nozzle disposed at an output end of the airflow chamber;
a first actuator configured to control a direction of the directable air output nozzle;
an adjustable damper;
a second actuator configured to control airflow through the cooling and ventilation outlet by actuating the adjustable damper;
circuitry including a network interface, the circuitry configured to accept commands over a network, to accept readings from the pressure sensor, and to control the first actuator and the second actuator;
wherein the circuitry is disposed on a circuit board that is configured to surround the airflow chamber;
wherein the cooling and ventilation outlet further comprises a limit detector configured to detect when the ball nozzle has reached a limit of its movement.

21. A cooling and ventilation outlet configured to connect to an HVAC duct, the cooling and ventilation outlet comprising:
an airflow chamber configured to direct air from the HVAC duct through the cooling and ventilation outlet;
a directable air output nozzle disposed at an output end of the airflow chamber;
a first actuator configured to control a direction of the directable air output nozzle;
an adjustable damper;
a second actuator configured to control airflow through the cooling and ventilation outlet by actuating the adjustable damper;
circuitry including a network interface, the circuitry configured to accept commands over a network, to accept readings from the pressure sensor, and to control the first actuator and the second actuator;
wherein the circuitry is disposed on a circuit board that is configured to surround the airflow chamber;
a shell, the shell being the part of the cooling and ventilation outlet configured to connect to an HVAC duct, the shell including a first connector component;
an inner body, the inner body including a second connector component; and
wherein the connection of the second connector component to the first connector component secures the inner body within the shell.

22. The cooling and ventilation outlet of claim 21, wherein the inner body is attachably contained within the shell by a push-to-release fastener.

23. The cooling and ventilation outlet of claim 21, wherein the shell including an attachment clip for attachment to a ceiling.

\* \* \* \* \*